United States Patent [19]

Tanaka

[11] Patent Number: 5,298,722
[45] Date of Patent: Mar. 29, 1994

[54] TIRE WARM-UP WRAP

[75] Inventor: Kunio Tanaka, Ibaraki, Japan

[73] Assignee: Teijin Limited, Osaka, Japan

[21] Appl. No.: 854,977

[22] Filed: Mar. 20, 1992

[30] Foreign Application Priority Data

Mar. 22, 1991 [JP] Japan .................................. 3-83109

[51] Int. Cl.$^5$ .................... B60B 39/00; B60C 11/00; H05B 3/03; H05B 3/36
[52] U.S. Cl. .................................... 219/545; 219/202
[58] Field of Search .............................. 219/545, 202

[56] References Cited

U.S. PATENT DOCUMENTS

| 1,168,146 | 1/1916 | Barnes | 219/545 |
| 2,496,279 | 2/1950 | Ely et al. | 219/545 |
| 4,518,851 | 5/1985 | Oppitz | 219/549 |
| 4,538,054 | 8/1985 | de la Bretonière | 219/545 |
| 4,713,531 | 12/1987 | Fennekels et al. | 219/545 |

FOREIGN PATENT DOCUMENTS

| 2537342 | 3/1976 | Fed. Rep. of Germany | 219/545 |
| 2388451 | 12/1978 | France | 219/202 |
| 48-18540 | 6/1973 | Japan | 219/545 |
| 60-104404 | 6/1985 | Japan | 219/202 |

Primary Examiner—Bruce A. Reynolds
Assistant Examiner—John A. Jeffrey
Attorney, Agent, or Firm—Armstrong, Westerman, Hattori, McLeland & Naughton

[57] ABSTRACT

A tire warm-up wrap used for pre-heating tires of motor racing cars and motor cycles immediately before the start of a race is provided with a heat generating narrow fabric woven from a warp containing (i) an electrically heat-generating flexible yarn made of a mixed yarn composed of discontinuous conductive metal fibers and non-conductive fibers, and (ii) a non-conductive fiber yarn, and a weft composed of a non-conductive fiber yarn. The fabric has in both of the lengthwise end portions thereof wefts composed of conductive metal wires which are divided into a plurality of metal wire electrodes. The electrically heat-generating flexible yarns of the warp and the divided metal wire electrodes form together a series circuit extending forward and backward alternately along the length of the fabric between the divided metal wire electrodes in both the end portions thereof.

13 Claims, 2 Drawing Sheets

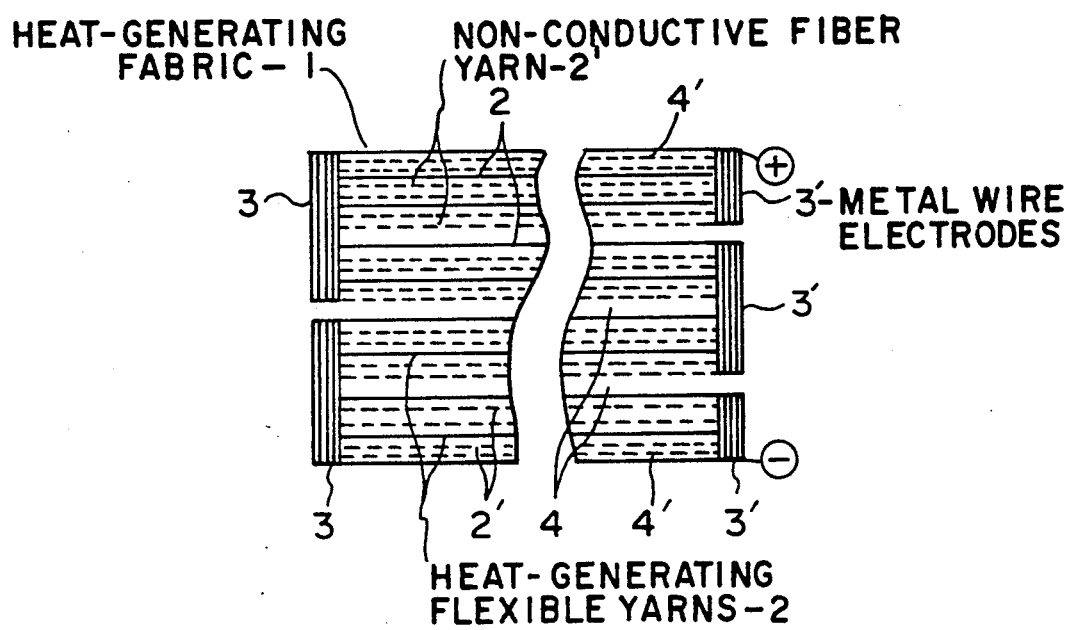
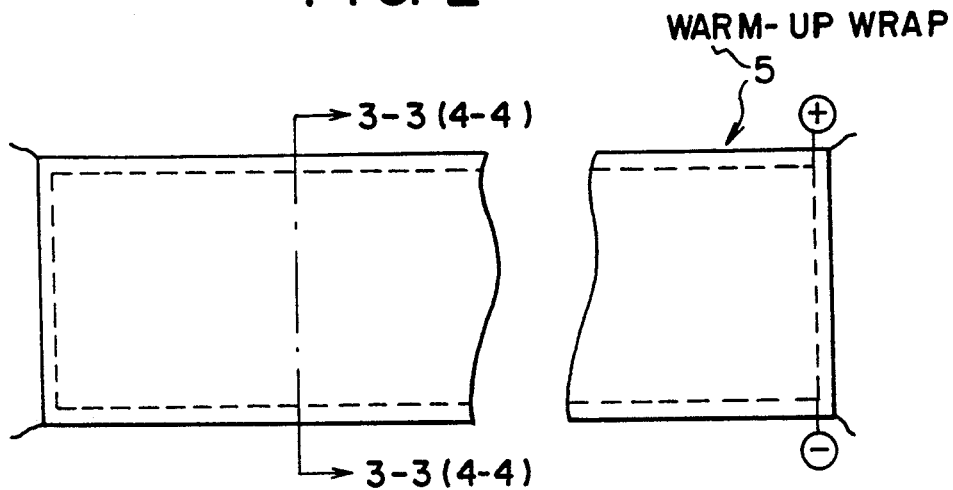

TIRE WARM-UP WRAP

BACKGROUND OF THE INVENTION

(1) Field of the Invention

This invention relates to a tire warm-up wrap, i.e., a wrapping device which is used for pre-heating tires of motor racing cars and motor cycles immediately before the start of a race.

(2) Description of the Related Art

Immediately after the start of a race, the temperature and pressure of motor racing tires are not yet at their normal track levels, and therefore, their road-holding is inferior and the acceleration force is not full. To obviate this defect, motor racing tires are usually pre-heated by a warm-up wrap immediately before the start of a race.

A typical example of conventional warm-up wrap comprises a sheet-form heat-generator made of superposed plastic films or fabrics which are stitched together with a plurality of long and parallel seam lines to form parallel hollow spaces, into which electric heating elements such as nichrome wires, chromium-iron wires and copper-nickel wires are inserted so as to constitute a series resistance circuit. The warm-up wrap is wrapped around a tire so that the tread thereof is entirely covered by the wrap and an electric current is applied thereto to heat the tread.

The above-mentioned warm-up wrap has problems such that uniform heating is difficult to attain, and the wrap has a poor flexural fatigue resistance and flexibility and hence wire breakage occurs due to repeated flexing during the use.

A proposal has been made wherein an electric-heating element of a thread form comprised of a thread coated with an electrically conductive layer composed of a synthetic resin having been dispersed therein particles of carbon or a metal (Japanese Unexamined Patent Publication No. 62-100771). This thread-form electric heating element has problems such that the electric resistance is large and the quantity of electricity is minor, and thus, it is difficult to heat a tire of a large size to the desired temperature within a reasonably short period of time, and also difficult to bend the wrap at a sharp angle.

SUMMARY OF THE INVENTION

The present invention aims at eliminating the problems with the prior art described above and providing a tire warm-up wrap for pre-heating motor racing tires which is characterized by good flexibility, flexural fatigue resistance, uniformity in heat generation, safety and dimensional stability.

In accordance with the present invention, there is provided a tire warm-up wrap which is provided with a heat-generating narrow fabric woven from a warp comprising (i) and electrically heat-generating flexible yarn which is made of a mixed yarn composed of discontinuous electrically conductive metal fibers and electrically non-conductive fibers, and (ii) a yarn of electrically non-conductive fibers, and a weft composed of a yarn of electrically non-conductive fibers; said heat-generating fabric having in both of the lengthwise end portions thereof wefts comprising electrically conductive metal wires which are cut into a plurality of divided metal wire electrodes each having a short length; and said electrically heat-generating flexible yarns of the warp and the respective divided metal wire electrodes form together a series circuit extending forward and backward alternately along the length of the heat-generating fabric between the divided metal wire electrodes in both of the lengthwise end portions thereof.

BRIEF DESCRIPTION OF THE DRAWINGS

FIG. 1 is a plan view showing an example of an electrically heat-generating fabric provided in the warm-up wrap of the present invention;

FIG. 2 is a plan view showing an example of the warm-up wrap of the present invention;

DESCRIPTION OF THE PREFERRED EMBODIMENTS

Figure 3:
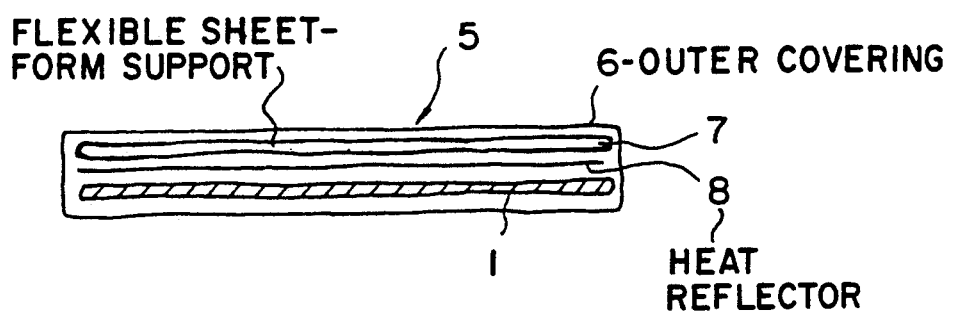
FIG. 3 is a sectional view taken along line A—A' of the warm-up wrap shown in FIG. 2.

The warm-up wrap of the present invention comprises an electrically heat-generating fabric enveloped in a covering. The electrically heat-generating narrow fabric is of a rectangular shape and has a width sufficient to cover the width of the tread of a tire and a length sufficient to cover the entire periphery of the tire.

The electrically heat-generating narrow fabric is woven from (1) a warp composed of (i) an electrically heat-generating flexible yarn which is made of mixed yarns composed of discontinuous electrically conductive metal fibers and electrically nonconductive fibers, and (ii) a yarn of electrically non-conductive fibers, and (2) a weft composed of electrically non-conductive fibers. The electrically conductive metal fibers are preferably made of a metal having a good ductility such as iron, copper, aluminum or an alloy thereof. Optimum metal fibers are stainless steel fibers having a diameter of 4 to 30 microns and a length of 100 to 800 mm.

The discontinuous electrically conductive metal fibers and electrically non-conductive fibers form a mixed yarn, two or more of which are combined into an electrically heat-generating flexible yarn used as a warp for the electrically heat-generating fabric. By appropriately mixing the electrically conductive metal fibers with electrically non-conductive fibers, the volume resistivity of the mixed yarn can be adjusted to a desired value. The mixing amounts of the electrically conductive metal fibers and the electrically non-conductive fibers are preferably 20 to 60% by weight and 80 to 40% by weight, respectively.

A preferable mixed yarn for the electrically heat-generating flexible yarn contains at least 20 stainless steel fibers having the above-mentioned diameter and length in the cross-section thereof and has a first twist coefficient of 6,500 to 13,500.

Two or more of the mixed yarns are subjected to a first twisting and then combined together, and subjected to a second twisting to form a cord yarn, i.e., an electrically heat-generating flexible yarn used as a warp for the electrically heat-generating narrow fabric. Preferably, the first twist and the second twist are of opposite directions and the ratio of the final twist coefficient to the first twist coefficient is in the range of 0.5 to 1.50. A preferable cord yarn has a line resistivity of 0.05 to 10 ohm/cm and a resistivity coefficient of variation (CV) not larger than 10%.

The electrically non-conductive fibers to be blended with the metal fibers to form the mixed yarn may be any of synthetic fibers, regenerated fibers and natural fibers.

Of these, wholly aromatic polyamide fibers, i.e., aramide fibers, are preferable because aramide fibers have a high thermal resistance and, even if the discontinuous electrically conductive metal fibers generate heat, aramide fibers neither deteriorate nor burn. As examples of the other preferable fibers, there can be mentioned fibers made of polymeric materials with a good heat resistance, such as polybenzimidazole fibers, polyimide fibers and polyether-ether-ketone fibers.

The procedure for making the mixed yarn is not particularly limited, but preferably the electrically conductive metal fibers and the electrically non-conductive fibers, both in the form of continuous filaments, are combined together and fed to a drafting apparatus where the combined filament are drafted whereby these continuous filaments are stretch-cut into discontinuous fibers with lengths of 100 to 800 mm.

The electrically heat-generating narrow fabric is woven from a warp comprising (i) the above-mentioned electrically heat-generating flexible yarn and (ii) an electrically non-conductive fiber yarn, and a weft of an electrically non-conductive fiber yarn. The electrically non-conductive fiber yarn is made from an electrically non-conductive fiber which can be selected from those explained above with respect to the making of the electrically heat-generating flexible yarn of the warp. The electrically heat-generating narrow fabric has a length sufficiently cover the entire peripheral length of the tread of a tire, i.e., usually has a length of 100 to 250 cm, and has a width sufficiently cover the tread of a tire, i.e., usually has a width of 5 to 50 cm.

A typical examples of the electrically heat-generating narrow fabric provided in the warm-up wrap of the present invention is illustrated in FIG. 1. In FIG. 1, the electrically heat-generating fabric 1 is made of warps which are composed of an electrically non-conductive fiber yarn 2', and a weft of an electrically non-conductive fiber yarn (not shown in FIG. 1). As warps, a plurality of the electrically heat-generating flexible yarns 2 and a plurality of the electrically non-conductive fiber yarns 2' are disposed in parallel at a certain distance. The electrically heat-generating narrow fabric 1 has in both of the lengthwise end portions wefts comprised of electrically conductive metal wires, which are cut into a plurality of divided metal wire electrodes of a short length 3,3'. In the example shown in FIG. 1, warps are disposed in parallel and in the form of a sheet as a whole, wherein a repeat composed of one end of an electrically heat-generating flexible yarn 2 and two ends of electrically non-conductive fiber yarns 2' are disposed recurrently.

At least one (usually both) of the metal wire wefts in both the lengthwise end portions of the electrically heat-generating narrow fabric 1 is divided into electrodes 3,3' of a short length. In one example shown in FIG. 1, the warps are divided into four groups and each of the divided metal wire electrodes 3,3' is connected to two adjacent groups of the warps, except for two electrodes 3',3' which are located on opposite side ends in one end portion of the heat-generating narrow fabric and which are connected to a positive electrode lead and a negative electrode lead, respectively. Each group of the electrically heat-generating flexible yarns 2 and the respective divided electrodes 3,3' form together a series circuit which extends forward and backward alternately along the length of the narrow fabric 1 between the divided metal wire electrodes 3,3' at both of the lengthwise end portions thereof. Thus, when an electric current is applied between the positive and negative electrode leads, an electric current flows in series forward and backward alternately along the length of the narrow fabric 1 between the divided metal wire electrodes 3,3' in both of the lengthwise end portions thereof. Each group of the warps in the example shown in FIG. 1 contains two electrically heat-generating flexible yarns 2, and therefore, the two yarns 2 may be said to constitute a parallel circuit between each pair of the confronting metal wire electrodes 3,3'.

The number of the divided metal wire electrodes in both of the lengthwise end portions is not particularly critical. In general, the number of the divided metal wire electrodes in one end portion in n and the number thereof in the other end portion is n+1, wherein n is an integer of at least 1. The total number (2n+1) of the divided metal wire electrodes in both of the lengthwise end portions is preferably in the range of 3 (i.e., n is 1) to 15 (i.e., n is 7). If the number of the divided metal wire electrodes is too large, the electric capacity of the heat-generating narrow fabric is too small to preheat the racing tires to a desired temperature (e.g., 80° C.) within a reasonably short period of time. In contrast, if the weft of the metal wire in both of the lengthwise end portions are not divided, the heat generation becomes non-uniform and the electric capacity is too large, and thus, the heating time required for pre-heating the racing tires to a desired temperature is too short and the temperature control is difficult. Thus, problems arise in handling and safety. The length of each divided metal wire electrode is usually from about 0.3 cm to about 4 cm.

As shown in FIG. 1, the heat-generating flexible yarns 2 containing electrically conductive metal fibers and the electrically non-conductive fiber yarns 2' are disposed in parallel in a manner such that each heat-generating flexible yarn 2 is contiguous to the electrically non-conductive fiber yarns 2' so that the heat-generating yarns 2 are not in contact with each other, i.e., are insulated from each other. In general, the number of the heat-generating flexible yarns 2 in each repeat of the warps can be selected from of 1 to 6 and the number of the electrically non-conductive fiber yarns 2' in each repeat of the warps can also be selected from 1 to 6. Further, the warps in both side edge portions 4' of the heat-generating narrow fabric are preferably composed only of electrically non-conductive fiber yarns 2' from the standpoint of safety.

The weft comprising metal wires to be woven into both of the lengthwise end portions of the heat-generating narrow fabric 1 for the formation of the divided metal wire electrodes 3,3' is not particularly limited provided that the metal wire weft has a good electric conductivity. A preferable metal wire weft is a flexible yarn composed of a core thread made of a fiber having a good thermal resistance such as an aramide fiber, and a metal foil herially wrapped around the core thread. Another metal wire weft is a stranded metal wire conductor composed of a plurality of twisted metal wires each having a diameter of 30 to 100 microns.

To obtain a desired rate of heat generation and uniformity in heat generation, the heat-generating fabric preferably satisfies the requirements represented by the following formula:

$$0.05S \text{ WATTS} < I^2R < 0.5S \text{ WATTS}$$

wherein S is area of the fabric (cm$^2$), I is intensity of electric current (ampere) and R is line resistance (ohm/cm). The magnitude of R can be desired value of appropriately selecting the number of the divided metal wire electrodes (in other words, the number of groups of the warps). If the "$I^2R$" value is not larger than 0.05S, the heat generation is poor and it is difficult to pre-heat the racing tires to a desired temperature (e.g., 80° C.) within a reasonably short period of time. In contrast, if the "$I^2R$" value is 0.5S or larger, the electric capacity is too large and the temperature control becomes difficult.

Figure 4:
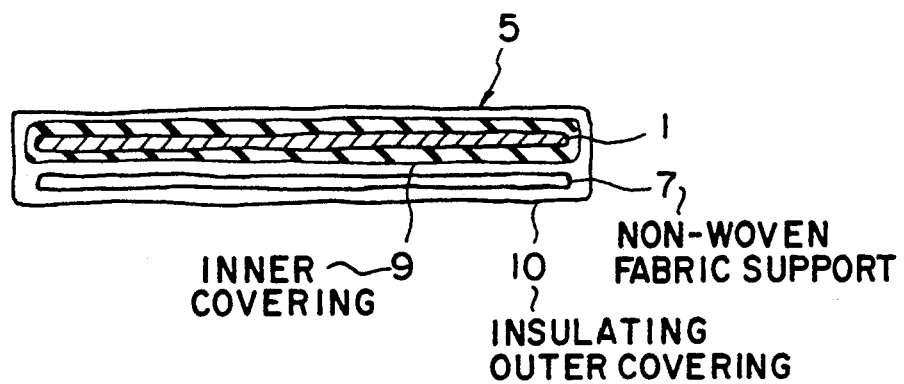
FIG. 4 is a sectional view of another example of the warm-up wrap of the present invention.

The warm-up wrap of the present invention comprises the above-mentioned electrically heat-generating narrow fabric enveloped in a covering. A typical example of the warm-up wrap is shown in FIGS. 2 and 3 and another example thereof is shown in FIG. 4. In the warm-up wrap 5 shown in FIGS. 2 and 3, the electrically heat-generating narrow fabric 1, a heat-reflector 8 such as an aluminum-deposited film or sheet, and a flexible sheet-form support 7 such as a nonwoven fabric support are superposed upon another, and these elements are enveloped in an outer covering 6 in the form of a bag made of an insulating fabric. In view of the safety (i.e., electrical insulation) and handling properties, it is preferable that the warm-up wrap has double coverings (although a single covering 6 is illustrated in FIG. 3). As shown in FIG. 2, one end portion of the warm-up wrap 5 is provided with a positive electrode lead at one end of said portion and a negative electrode lead at the other end of said portion, which preferably have a configuration suitable for applying an electric current thereto. When the warm-up wrap 5 shown in FIG. 3 is used, the lower side thereof is placed in contact with a racing tire.

The warm-up wrap 5 shown in FIG. 4 comprises the electrically heat-generating fabric 1 enveloped in an inner covering 9 which is a bag made of an insulating fabric, for example, a glass cloth impregnated with silicone rubber. The inner covering 9 and a nonwoven fabric support 7 made of, for example, an aramide fiber such as a poly-m-phenylene isophthalamide fiber are enveloped in an insulating outer covering 10. As a modification of this warm-up wrap 5, the inner cover 9 may be omitted. When the warm-up wrap 5 shown in FIG. 4 is used, the upper side thereof is placed in contact with a racing tire. The outer covering 10 can be made of a laminate composed of a base fabric made of an aramide fiber such as a poly-m-phenylene isophthalamide fiber, and a polyurethane film. The polyurethane film preferably contains about 10% by weight of a ceramic material. By the incorporation of a ceramic material, the heating effect due to heat radiation of the warm-up wrap is enhanced. The base fabric made of an aramide fiber is advantageous from the standpoint of thermal resistance and fire retardance.

When the warm-up wrap of the present invention is used, it is wrapped around a racing tire so that the tread of the tire is covered by the warm-up wrap, and an electric current is turned on, immediately before the start of a race.

The warm-up wrap of the present invention will now be specifically described by the following examples that by no means limit the present invention.

MANUFACTURE OF FABRIC FOR ELECTRICALLY HEAT-GENERATING FABRIC

EXAMPLE 1

A bundle of 1,500 stainless steel continuous filaments having a single filament diameter of 12 microns and a volume resistivity of the order of $10^{-5}$ ohm.cm is combined with a bundle of about 2,700 poly-p-phenylene terephythalamide continuous filaments having a single filament fineness of 2 deniers. The combined filament bundles were subjected to drafting to obtain a mixed yarn having a total fineness of 500 deniers and an average fiber length of about 310 mm and containing about 75 stainless steel discontinuous fibers. The mixed yarns were subjected to a first twisting at 500 T/M. Four of the twisted mixed yarn were combined and subjected to a second twisting at 355 T/M to obtain an electrically heat-generating flexible yarn A having a total fineness of 2,000 deniers. The yarn A had a volume resistivity of the order of $10^{-4}$ ohm.cm. A lengthy fabric having a width of 20 cm, a warp density of 38.1 ends/inch and a weft density of 45 picks/inch was woven wherein 100 ends of the heat-generating flexible yarn A and 200 ends of poly-p-phenylene terephthalamide continuous filament yarn B having a total fineness of 500 deniers were used as warps and only the poly-p-phenylene terephthalamide continuous filament yarns B were used as wefts.

A metal wire used for electrodes provided in both end portions of the fabric was prepared by wrapping a foil made from a copper wire having a diameter of 0.1 mm, around a core of the poly-p-phenylene terephthalamide continuous filament yarn B. The above-mentioned lengthy fabric was cut into a length of 190 cm and 20 picks of the metal wire were woven as the weft to each of both ends of the narrow fabric whereby a fabric P having metal wire weft woven in both of the end portions thereof was made.

EXAMPLE 2

A narrow fabric Q was made by the same procedures as described in Example 1 except that 20 ends of the heat-generating flexible yarn A and 280 ends of the poly-p-phenylene terephthalamide continuous filament yarn B were used as wefts. All other procedures and conditions remained substantially the same.

EXAMPLE 3

A narrow fabric R was made by the same procedures as described in Example 1 except that 200 ends of the heat-generating flexible yarn A and 100 ends of the poly-p-phenylene terephthalamide continuous filament yarn were used as wefts. All other procedures and conditions remained substantially the same.

MANUFACTURE OF ELECTRICALLY HEAT-GENERATING FABRICS

As shown in FIG. 1, the metal wire wefts 3 in one lengthwise end portion of the narrow fabric having a width of 20 cm was divided into two parts and the metal wire wefts 3' in the other lengthwise end portion thereof was divided into three parts. A positive electrode lead was fixed to one of the divided metal wire wefts 3' which is positioned at one end of one lengthwise end portion and a negative electrode lead was fixed to another of the divided metal wire wefts 3' which is positioned at the other end of the lengthwise end portion whereby an electrically heat-generating narrow fabric was made. In the narrow fabric, 300 ends of the warps including the heat-generating flexible yarns were divided into four groups, and each of the four groups was connected to the adjacent groups through the metal wire electrodes 3,3' in both of the lengthwise end portions of the fabric, thus forming a series circuit as a whole.

As other embodiments (not shown in the figures), three heat-generating fabrics were made by the same procedures as described above except that the total number (2n+1) of the divided metal wire electrodes in both of the lengthwise end portions of each fabric was changed to 3 (n=1), 7 (n=3) and 11 (n=5) (i.e., the number of groups of the warp is 2, 6 and 10, respectively).

EVALUATION OF HEAT-GENERATING FABRICS

To evaluate the heat generation property and safety of the heat-generating fabrics, an electric current was applied to each fabric using a 100 V power source.

The uniformity in heat generation was determined by measuring the temperature over the entire surface of the fabric and evaluating the temperature distribution.

The temperature elevating period is the period from the time of turning on an electric current to the time when the fabric reached 80° C., i.e., the desired temperature to which a racing tire should be pre-heated.

The safety was determined by collectively evaluating the fluctuation in heat generation, the rapid temperature elevation and other factors.

The results are shown in Table 1.

TABLE 1

| Fabirc for heat-generating fabric | Number of groups of warp | $I^2R$ (XS) | Uniformity in heat generation | Temperature elevating period | Safety |
|---|---|---|---|---|---|
| P | 1* | 1.73 | Poor | 25" | Unacceptable |
| warp: A 100 | 4 | 0.108 | Good | 4'58" | Acceptable |
| B 200 | 6 | 0.045 | Good | 48' | Acceptable |
| Q | 1* | 0.346 | Poor | 45" | Unacceptable |
| warp: A 20 | 2 | 0.086 | Good | 5'13" | Acceptable |
| B 280 | 4 | 0.022 | Good | ** | Acceptable |
| R | 1* | 3.46 | Poor | 10" | Unacceptable |
| warp: A 200 | 4 | 0.216 | Good | 3'34" | Acceptable |
| B 100 | 10 | 0.034 | Good | ** | Acceptable |

Note:
A: Heat-generating flexible yarn
B: Poly-p-phenylene terephthalamide continuous filament yarn
*: The figure "1" means that the metal wire wefts in both end portions were not divided for comparison purpose
**: Temperature did not reach the desired temperature

What is claimed is:

1. A tire warm-up wrap, comprising a heat-generating narrow fabric woven from a warp having:
   (i) an electrically heat-generating flexible yarn which is made of a plurality of mixed yarn including between 20 and 60% by weight of discontinuous electrically conductive metal fibers and between 80 and 40% by weight of electrically non-conductive fibers; and
   (ii) a yarn composed of electrically non-conductive fibers, and (b) a weft composed of a yarn composed of electrically non-conductive fibers, wherein each of said mixed yarns includes at least 20 discontinuous electrically conductive metal fibers and is made by drafting a bundle of electrically conductive metal continuous filaments combined with a bundle of electrically non-conductive continuous filaments to stretch-cut at least the metal continuous filaments into a length of between 100 and 800 mm, wherein said electrically heat-generating flexible yarn has a line resistivity of between 0.05 and 10 ohm/cm and a resistivity coefficient of variation (CV) not larger than 10% and is made by subjecting the mixed yarn to a first twisting and then subjecting a plurality of the first-twisted mixed yarns to a second twisting under conditions such that the first-twisted mixed yarn has a first twist coefficient of between 6,500 and 13,500 and the ratio of the first twist coefficient to the second twist coefficient is between 0.5 and 1.50, wherein said heat-generating narrow fabric comprises in both of the lengthwise end portions thereof wefts which includes electrically conductive metal wires which are cut into a plurality of divided metal wire electrodes each having a short length, and wherein said electrically heat-generating flexible yarns of the warp and the respective divided metal wire electrodes form a series circuit extending forward and backward alternately along the length of the heat-generating narrow fabric between sets of the electrically heat-generating flexible yarns and between the divided metal wire electrodes in both of the lengthwise end portions thereof, wherein each of the set has a substantially equal number of the electrically heat-generating flexible yarns.

2. A tire warm-up wrap according to claim 1, wherein the discontinuous electrically conductive metal fibers have a diameter of between 4 and 30 microns and length of between 100 and 800 mm.

3. A tire warm-up wrap according to claim 1, wherein the warp comprises between 1 and 6 ends of said electrically heat-generating flexible yarn and between 1 and 6 ends of a yarn of electrically non-conductive fibers.

4. A tire warm-up wrap according to claim 1, wherein the electrically non-conductive fibers are made of a heat-resistant polymeric material.

5. A tire warm-up wrap according to claim 7, wherein the heat-resistant polymeric material is a wholly aromatic polyamide.

6. A tire warm-up wrap according to claim 1, wherein the number of the divided metal wire electrodes in one lengthwise end portion of the heat-generating narrow fabric is n and the number of the divided metal wire electrodes in the other lengthwise end portion thereof is n+1, wherein n is an integer of between 1 and to 7.

7. A tire warm-up wrap according to claim 1, wherein said heat-generating narrow fabric satisfies the following formula:

$$0.05S \text{ (WATTS)} < I^2R < 0.5S \text{ (WATTS)}$$

wherein S is area of the fabric ($cm^2$), I is intensity of electric current (ampere) and R is lien resistivity (ohm/cm).

8. A tire warm-up wrap according to claim 1, wherein said heat-generating narrow fabric is enveloped together with a flexible sheet-form support within an outer covering.

9. A tire warm-up wrap according to claim 8, wherein said outer covering is made of a laminate including a base fabric of a heat-resistant fiber, and a polyurethane film.

10. A tire warm-up wrap according to claim 9, wherein said polyurethane film contains a ceramic material.

11. A tire warm-up wrap according to claim 1, wherein said heat-generating fabric is enveloped in an inner covering and the inner covering is enveloped together with a flexible sheet-form support within an outer covering.

12. A tire warm-up wrap according to claim 11, wherein said outer covering is made of a laminate including a base fabric of a heat-resistant fiber, and a polyurethane film.

13. A tire warm-up wrap according to claim 12, wherein said polyurethane film contains a ceramic material.

* * * * *